April 15, 1930. P. J. HENNING ET AL 1,754,625

PISTON RING

Filed Sept. 8, 1927

Inventor
Wilbur H. Judy and
Paul J. Henning
By Rockwell & Bartholow
Attorney

Patented Apr. 15, 1930

1,754,625

UNITED STATES PATENT OFFICE

PAUL J. HENNING AND WILBUR H. JUDY, OF BUENOS AIRES, ARGENTINA

PISTON RING

Application filed September 8, 1927. Serial No. 218,302.

Our invention relates to a new means of preventing the leakage of steam or gases through the clearance space between the piston and cylinder walls of reciprocating engines and has for its primary object a great improvement in the known methods thereby greatly reducing repair costs and at the same time effecting a great saving in fuel.

We are aware that many types of piston rings have been proposed for effectively sealing the clearance space between the piston and cylinder walls of reciprocating engines. In the majority of piston ring designs heretofore proposed effective sealing depends upon a ring or rings being expanded snugly against the cylinder wall but our invention refers to a new method radically different from anything heretofore proposed and we employ an entirely new principle by means of which a gas seal is effectively accomplished.

To those versed in the art it is well known that in steam turbine design it is extremely important that blades and nozzles be arranged so that losses due to eddying, shock, compression, and friction are as small as possible.

After much research and experimentation we have found that through the use of those elements objectionable in steam turbine construction we are able to create a steam or gas seal which can be used to seal the clearance space between the piston and cylinder walls of reciprocating engines.

We have discovered that reciprocating engines equipped with gas seal piston rings may be operated at higher speeds and with less fuel consumption than when equipped with metallic packing or sealing rings. Also that our gas seal ring may be used with superheated steam as effectively as with saturated steam and that no lubrication of the cylinder walls is necessary because the piston floats on the gas seal.

Reference will now be had to the accompanying drawings in which

Figure 3:
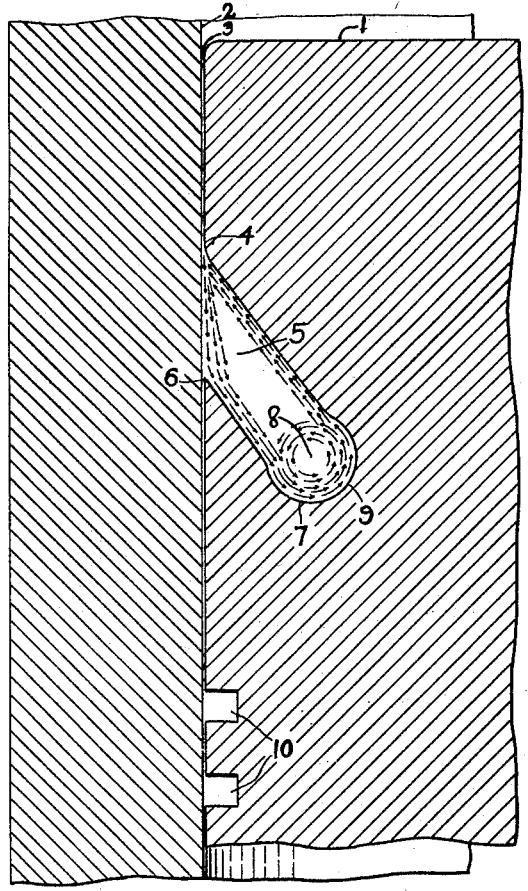
Fig. 3 is an enlarged fragmentary sectional view of a part of the cylinder wall and piston.

As a preferred form of our invention, we have illustrated a piston 1 mounted within a cylinder having a wall 2. As is usual in this type of structure, a certain amount of clearance is provided between the piston and the cylinder wall, but it will be observed that a departure has been made from the usual practice, in that we do not provide any piston rings or packing to fill this space and contact with the wall of the cylinder.

Between piston ring 1 and cylinder wall 2 is clearance space 3, which is very small but through which high pressure gas or steam passes rapidly when admitted to the cylinder. When the steam or gas reaches point 4 it is released into groove 5 where it expands very rapidly with accompanying great increase in velocity and strikes lip 6 which deflects it into reversing chamber 7 where an eddy 8 of extremely high velocity is set up. Due to the sudden reversal of the high velocity gases in chamber 7 it becomes highly compressed at point 9 and is released with great force against the stream of incoming gases near point 4 thereby sealing groove 5 against the further admission of steam or gases through clearance space 3. Top sealing groove 5 seals the cylinder on the down stroke and bottom groove 5A seals the cylinder on the up stroke.

Practically no steam or gas passes lip 6 but as an added precaution we provide one or more water seal grooves 10 between upper and lower gas seal grooves 5 and 5A.

It will be noted that as the clearance space between the piston and the cylinder wall is filled by the gas or steam, or other pressure fluid, no part of the piston comes in contact with the cylinder wall, but the latter "floats" in a position spaced within the wall in its movements. This eliminates friction between the piston and the cylinder, and results in a considerable saving in fuel when used in connection with an engine, as well as reducing the wear upon the parts.

Figure 1:
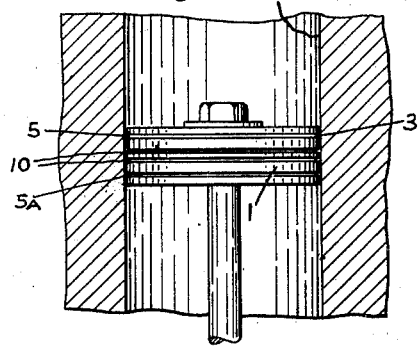
Fig. 1 is a cross-sectional view of a cylinder having mounted therein a piston embodying my improvements.

Our sealing grooves may be cut into a ring as described and shown in Figure 1 or they may be cut into a ring cast integral with the follower plate or in a ring cast integral with the piston and we therefore desire it to be understood that our invention relates in general to the sealing of piston clearances in reciprocating engines by means of a steam or gas seal and that we do not limit ourselves to any particular design or construction of ring.

It will be observed that our invention is readily applicable to any device wherein a fluid under pressure is confined in a cylinder by a piston. It may, for instance, be used in connection with water pumps, the groove 5 acting efficiently to seal the space between the plunger and the cylinder of the pump; that is, any water or other liquid entering the space 3 will have its direction reversed in the groove 5 and will meet any incoming liquid and repel the same.

Figure 2:
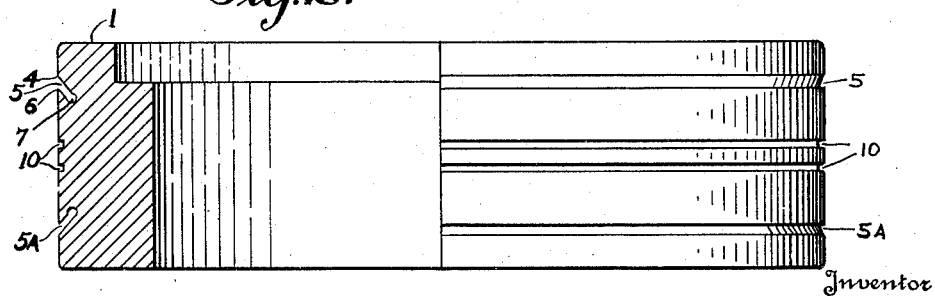
Fig. 2 is a side elevational view partly in section of a piston ring embodying my improvements.

The groove 5 will preferably be inclined inwardly, as shown in Figs. 2 and 3, in a direction away from the adjacent face of the piston, or, in other words, in the direction of the incoming fluid.

It will be noted that the groove 5, as shown, is inclined in a direction away from the active face of the piston adjacent to which it is located. It is also preferred to have the groove somewhat deeper than the width of its mouth, although we do not wish to limit ourserves to the exact dimensions of the groove shown. The reversing chamber 7 may also be of slightly greater width than the groove 5 which leads thereinto in order to give room for the eddy 8 set up by the fluid striking the bottom of the chamber 7.

What we claim is:

1. A piston for a cylinder adapted to contain a fluid under pressure, said piston having a relatively loose fit in the cylinder to provide a passage for fluid therebetween, and means for reversing the direction of flow of said fluid and directing the fluid against the fluid passing between the cylinder and piston to oppose the passage thereof, said means for reversing the direction of flow of the fluid comprising a groove in the piston communicating with the passage between the cylinder and piston, the groove being inclined towards that end of the piston from which the fluid passes and being provided with a concave bottom.

2. A piston for a cylinder adapted to contain a fluid under pressure, said piston having a relatively loose fit in the cylinder to provide a passage for fluid therebetween, means for expanding and thereby increasing the velocity of the fluid passing between the piston and cylinder, and means for directing the expanded fluid against the fluid passing between the cylinder and piston to oppose the passage thereof, said means for reversing the direction of flow of the fluid comprising a groove in the piston communicating with the passage between the cylinder and piston, the groove being inclined towards that end of the piston from which the fluid passes, and an enlarged chamber at the bottom of the groove.

3. A piston for a cylinder adapted to contain a fluid under pressure, said piston having a relatively loose fit in the cylinder to provide a passage for fluid therebetween, means for expanding and thereby increasing the velocity of the fluid passing between the piston and cylinder, and means for directing the expanded fluid against the fluid passing between the cylinder and piston to oppose the passage thereof, said means for reversing the direction of flow of the fluid comprising a groove in the piston communicating with the passage between the cylinder and piston, the groove being inclined towards that end of the piston from which the fluid passes, and an enlarged torus-shaped chamber at the bottom of the groove.

In testimony whereof we have hereunto set our hands in presence of two subscribing witnesses.

PAUL J. HENNING.
WILBUR H. JUDY.